(12) United States Patent
Auer et al.

(10) Patent No.: US 10,690,068 B2
(45) Date of Patent: Jun. 23, 2020

(54) METHOD AND CONTROL DEVICE FOR OPERATION OF AN ENGINE

(71) Applicants: Matthias Auer, Munich (DE); Markus Bauer, Augsburg (DE); Paul Hagl, Augsburg (DE); Markus-Christian Meier, Augsburg (DE); Jürgen Metzger, Augsburg (DE)

(72) Inventors: Matthias Auer, Munich (DE); Markus Bauer, Augsburg (DE); Paul Hagl, Augsburg (DE); Markus-Christian Meier, Augsburg (DE); Jürgen Metzger, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 14/944,373

(22) Filed: Nov. 18, 2015

(65) Prior Publication Data

US 2016/0146133 A1 May 26, 2016

(30) Foreign Application Priority Data

Nov. 20, 2014 (DE) .................. 10 2014 017 124

(51) Int. Cl.
*F02D 41/00* (2006.01)
*F02D 41/40* (2006.01)
*F02D 19/10* (2006.01)

(52) U.S. Cl.
CPC ......... *F02D 41/0027* (2013.01); *F02D 19/10* (2013.01); *F02D 41/402* (2013.01);
(Continued)

(58) Field of Classification Search
CPC .... F02D 41/0027; F02D 19/10; F02D 41/402; F02D 41/0025
See application file for complete search history.

(56) References Cited

U.S. PATENT DOCUMENTS

2011/0005491 A1* 1/2011 Terada .................. F02D 35/026
123/299
2011/0088654 A1 4/2011 Courtoy et al.
(Continued)

FOREIGN PATENT DOCUMENTS

| CN | 1401053 | 3/2003 |
|---|---|---|
| CN | 1460149 | 12/2003 |

(Continued)

OTHER PUBLICATIONS

Office Action dated Mar. 20, 2019 issued in Chinese Patent Application No. 201510804560.7.

*Primary Examiner* — Kevin A Lathers
(74) *Attorney, Agent, or Firm* — Cozen O'Connor

(57) ABSTRACT

A method for operating an engine, such as a dual-fuel engine, that includes a plurality of cylinders in which an air/gas mixture of air and gaseous fuel is ignited during a power stroke using an ignition fluid that is injected into each cylinder during a power stroke of the cylinder. The air/gas mixture is injected into each cylinder, and the injection fluid is injected into the each cylinder into which the air/gas mixture has been injected. The ignition fluid is injected into the each cylinder in at least two consecutive injections during the power stroke of the each cylinder.

13 Claims, 2 Drawing Sheets

(52) U.S. Cl.
CPC ........ *F02D 41/0025* (2013.01); *F02D 41/401* (2013.01); *Y02T 10/36* (2013.01); *Y02T 10/44* (2013.01)

(56) References Cited

U.S. PATENT DOCUMENTS

| | | |
|---|---|---|
| 2014/0069384 A1 | 3/2014 | Suzuki et al. |
| 2014/0158088 A1 | 6/2014 | Gehrke et al. |

FOREIGN PATENT DOCUMENTS

| | | | |
|---|---|---|---|
| CN | 1502008 | 6/2004 | |
| CN | 101498267 | 8/2009 | |
| CN | 101578442 | 11/2009 | |
| CN | 101725427 | 6/2010 | |
| CN | 102483007 | 5/2012 | |
| CN | 103502610 | 1/2014 | |
| CN | 103511103 | 1/2014 | |
| DE | 102008007325 A1 * | 8/2009 | ........... F02D 19/061 |
| EP | 2927463 | 10/2015 | |
| JP | 2003-074403 | 3/2003 | |
| JP | 2004-027939 | 1/2004 | |
| JP | 2008-223722 | 9/2008 | |
| JP | 2014-109199 | 6/2014 | |
| JP | 2015-187397 | 10/2015 | |
| WO | WO 01/59285 | 8/2001 | |
| WO | WO 2012/157041 | 11/2012 | |

* cited by examiner

METHOD AND CONTROL DEVICE FOR OPERATION OF AN ENGINE

BACKGROUND OF THE INVENTION

1. Field of the Invention

The present invention is directed to a method for operating an engine, such as a dual-fuel engine, in a manner that provides improved combustion of the air/gas mixture and increased efficiency of engine operation, and to a control device for implementing the inventive method.

2. Background of the Invention

In known so-called dual-fuel engines, a liquid fuel such as diesel can be burned in a liquid fuel operating mode and a gaseous fuel such as natural gas can be burned in a gaseous fuel operating mode of the engine. Generally, in the gaseous fuel operating mode a lean air/gas mixture is injected into the cylinders of the engine and ignited by the ignition energy of an ignition fluid which is likewise injected into the cylinders. To provide this functionality, a dual-fuel engine includes an ignition fluid injection system that has an ignition fluid delivery pump shared by a plurality of cylinders, an ignition fluid reservoir shared by a plurality of cylinders, and individual ignition fluid injectors for the plurality of cylinders. In operation, the ignition fluid is injected into each respective cylinder shortly before top dead center of the cylinder piston in the combustion chamber of the cylinder, i.e. with a single injection per power stroke of the cylinder.

SUMMARY OF THE INVENTION

It is an object of the invention is to provide a novel method and a control device for the operating an engine, such as a dual-fuel engine, that provides improved combustion of the air/gas mixture in the engine cylinders and increased engine operating efficiency without requiring significant modification of existing engines.

In accordance with the invention, the ignition fluid is injected into the respective cylinder in at least two consecutive injections during the power stroke of the cylinder. As a consequence of this, the burning of the air/gas mixture in the engine cylinder is improved and, therefore, the efficiency of the engine is increased.

In an advantageous implementation of the invention, in the power stroke of the respective cylinder, the ignition fluid is injected into the cylinder in a first injection with a first start of injection in a crank angle range between about 90° BTDC and 30° BTDC, preferably in a crank angle range between about 85° BTDC and 35° BTDC, and most preferably in a crank angle range between about 70° BTDC and 40° BTDC, and in a second injection with a second start of injection in a crank angle range between about 40° BTDC and 20° BTDC, wherein the second start of injection of the second injection occurs after a first end of injection of the first injection. In this way, the combustion of the air/gas mixture in the respective engine cylinder can be further improved and, accordingly, the efficiency of the engine can be further increased.

In accordance with a further advantageous implementation of the invention, an injection amount of ignition fluid in the respective power stroke of the respective cylinder is distributed between the injections such that between 60% and 80% of the total injection amount of ignition fluid is injected into the cylinder for the power stroke in the first injection and between 20% and 40% of the total injection amount of ignition fluid is injected into the cylinder for the power stroke in the second injection. This further improves the combustion of the air/gas mixture and still further increases the efficiency of the engine.

The amounts of injection fluid injected may vary from cylinder to cylinder. Each cylinder can thus be operated optimally, in particular when the engine includes an individual cylinder controller.

The invention further provides a control device for implementing the above-described method, as disclosed and detailed below.

These and other objects and features of the present invention will become apparent from the following detailed description considered in connection with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 1:
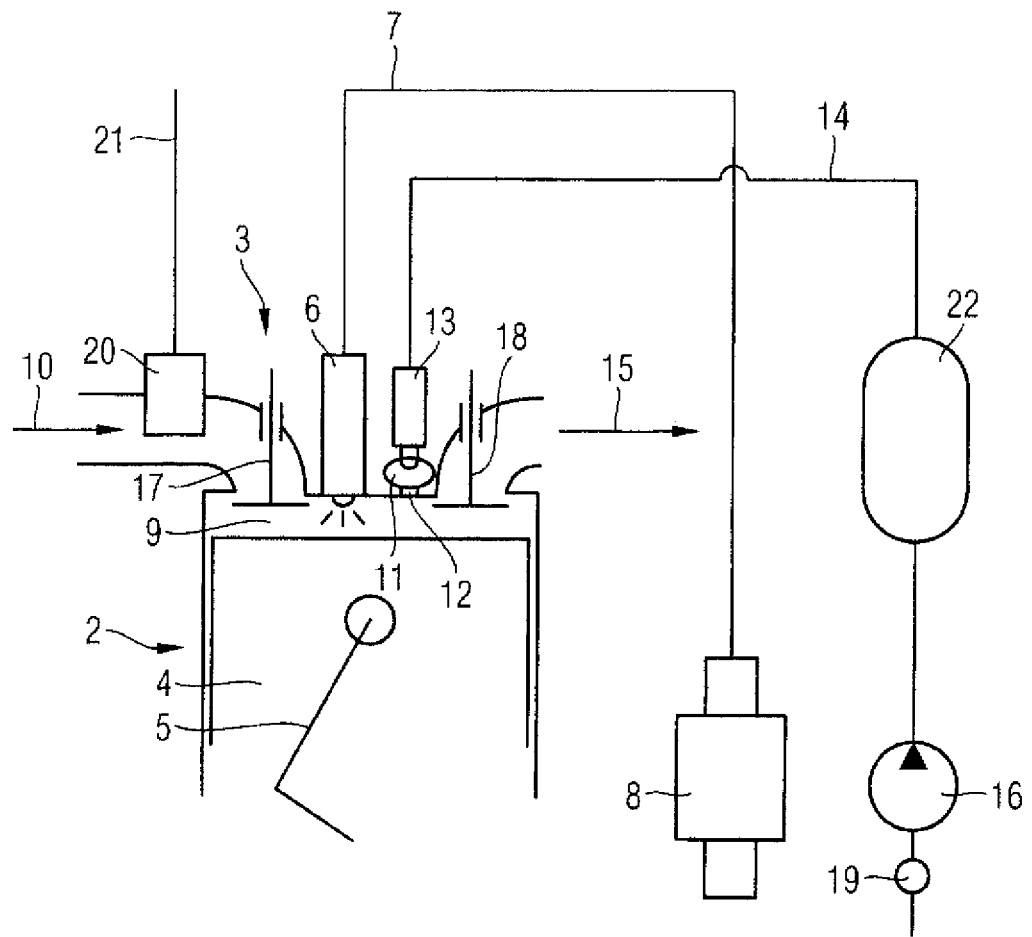
FIG. 1 is a schematic view of a dual-fuel engine in which the inventive method can be implemented.

FIG. 1 schematically depicts an engine, constructed as a dual-fuel engine, implementing a preferred embodiment of the method of the invention.

The engine includes a plurality of cylinders, including by way of illustrative depiction a cylinder 2 having a cylinder head 3. A piston 4 that is guided by a connecting rod 5 moves up and down in cylinder 2 in the operation of the engine. Fastened in cylinder head 3 is a fuel injector 6 through which liquid fuel, such in particular as diesel fuel, can be directly injected into a combustion chamber 9 of cylinder 2 via a fuel line 7 and/or a fuel reservoir (not shown) from a fuel pump 8. The fuel pump 8 is preferably driven by or from a crankshaft of the engine. The fuel injector 6, fuel line 7 and fuel pump 8 are elements of a fuel supply arrangement which serves to supply liquid fuel to the combustion chamber 9 of cylinder 2. This fuel supply arrangement is active when liquid fuel, such as diesel, is burned as fuel in the cylinder 2 of the dual-fuel engine, i.e., in a liquid fuel operating mode of the dual-fuel engine.

Additional charge air 10 can be introduced into the cylinder 2 of the dual-fuel engine via an inlet valve 17 to burn the liquid fuel, and exhaust gas 15 arising from combustion of the fuel can be guided out of the cylinder 2 via an exhaust valve 18.

In a gaseous fuel operating mode, gas can also be burned as fuel in the combustion chamber 9 of the dual-fuel engine. To this end, the dual-fuel engine has a mixture formation unit 20 in which is a mixture of combustion air 10 and gas is formed and supplied via a gas supply line 21. This air/gas mixture is introduced into the combustion chamber of cylinder 2 via the inlet valve 17. Exhaust gas 15 is also formed during the combustion of gas and can be guided out of the cylinder 2 via the exhaust valve 18.

Ignition fluid is used to ignite the air/gas mixture in the gaseous fuel operating mode of cylinder 2 of the dual-fuel engine. This ignition fluid can be injected into a further combustion chamber 11 of the cylinder by means of an ignition fluid injector 13. The further combustion chamber 11 of cylinder 2 is coupled to combustion chamber 9 by at least one connection channel 12. It should be understood that the ignition fluid can also be injected directly into combustion chamber 9.

The ignition fluid injector 13 of the cylinder 2 shown in FIG. 1 is a component part of an ignition fluid injection system of the engine. The ignition fluid injection system includes an individual ignition fluid injector 13 for each cylinder 2 of the engine. The ignition fluid injectors 13 can be supplied with ignition fluid via an ignition fluid line 14 that is connected to a common ignition fluid reservoir 22 of the ignition fluid injection system. An ignition fluid delivery pump 16 associated with the ignition fluid reservoir 22 supplies the ignition fluid reservoir 22 with ignition fluid. The ignition fluid delivery pump 16 is preferably an electrically operated high-pressure pump and, toward this end, a suction nozzle 19 is associated with the ignition fluid delivery pump 16.

The present invention provides functionality by which the gas or air/gas mixture can be optimally burned with high efficiency in the gaseous fuel operating mode.

In the gaseous fuel operating mode of the dual-fuel engine, during every power stroke of a cylinder 2 the air/gas mixture is first introduced into the combustion chamber 9 of the respective cylinder 2 and the ignition fluid is then injected into the cylinder. In this manner, in accordance with the invention, the ignition fluid is injected into the respective cylinder 2 during every power stroke of the respective cylinder 2 in at least two consecutive injections and not, as is conventional in current practice, with only a single injection for every power stroke of the respective cylinder 2.

During the power stroke of the cylinder 2, the ignition fluid is injected into the cylinder in a first injection with a first start of injection in a crank angle range between about 90° BTDC and 30° BTDC. The first start of injection of the first ignition fluid injection is preferably between about 85° BTDC and 35° BTDC and, in a particularly preferred implementation, the first start of injection of the first ignition fluid injection is between about 80° BTDC and 40° BTDC. BTDC denotes the "Before Top Dead Center" position of the piston 4 of the respective cylinder 2.

During the respective power stroke of the cylinder 2, the ignition fluid is subsequently injected into the respective cylinder 2 in a second injection with a second start of injection in a crank angle range between about 40° BTDC and 20° BTDC. The second start of injection of the second ignition fluid injection occurs after a first end of injection of the first ignition fluid injection.

Typically the angle advanced between the start of an injection and the end of an injection of ignition fluid is between about 2° and 15°. Accordingly, an injection of ignition fluid starting at about 40° BTDC typically ends at between about 36° BTDC and 32° BTDC.

The amount of ignition fluid that is injected in a respective power stroke of the cylinder 2 is preferably distributed or divided between the multiple ignition fluid injections, i.e. between the first injection of ignition fluid and the second injection of ignition fluid, such that between about 60% and 80% of the total injection amount of ignition fluid is injected into the cylinder for the power stroke in the first ignition fluid injection and between about 20% and 40% of the total injection amount of ignition fluid is injected into the cylinder for the same power stroke in the second ignition fluid injection.

Figure 2:
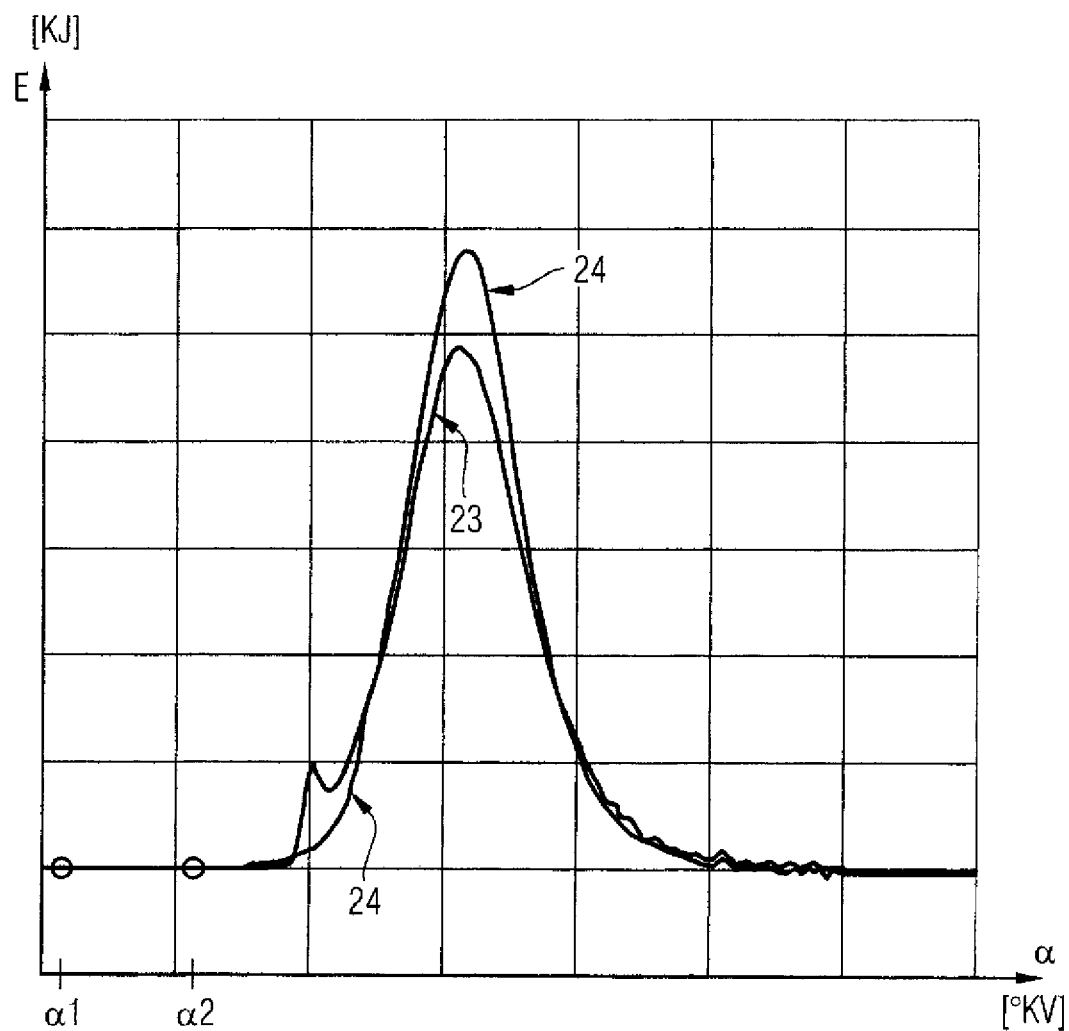
FIG. 2 is a graph comparing combustion in an engine operated (i) in accordance with the prior art and (ii) in accord with the method of the present invention.

As a consequence of the inventive methods, combustion of the air/gas mixture in each cylinder 2 of the engine is improved and, correspondingly, the operating efficiency of the engine is increased. FIG. 2 graphically depicts a curve 23 illustrating combustion of an air/gas mixture in accordance the conventional or prior art operation during a power stroke in a cylinder 2, i.e., when the ignition fluid is injected into the cylinder with an individual (i.e. only one) injection per power stroke. The combustion curve 24 in FIG. 2, on the other hand, shows combustion of an air/gas mixture in accordance with the invention during a power stroke in a cylinder 2, i.e., when the ignition fluid is injected into the cylinder in at least two consecutive injections per power stroke, wherein the start of the first injection is at crank angle $\alpha 1$ and the start of the second injection is at crank angle $\alpha 2$. In FIG. 2, the supplied combustion energy E in KiloJoules (KJ) is plotted over the crank angle $\alpha$ in crank angle degrees. It is apparent in FIG. 2 that use of the teachings of the present provides faster and more stable combustion, a higher maximum conversion rate and improved burnout. On the whole, the operating efficiency of the engine is notably increased.

Between the first injection of ignition fluid and the second injection of ignition fluid, and/or after the second injection of ignition fluid, a further injection of ignition fluid can be carried out starting after the end of injection of the respective preceding ignition fluid injection. In this implementation of the inventive method, the ignition fluid is injected into the cylinder 2 of the engine in at least three injections per power stroke, thereby further improving combustion of the air/gas mixture in the cylinder and further increasing the operating efficiency of the engine.

Although it is generally preferred that the inventive method be used in dual-fuel engines in the gaseous fuel operating mode, the invention can also be applied to engines in which only a gaseous fuel is burned using an ignition fluid, i.e., engines in which there is no liquid fuel operating mode, in contrast to dual-fuel engines.

The present invention additionally provides a control device in an engine for implementing the inventive method as herein disclosed and described. The control device is preferably an engine control device that includes means, in the form of hardware and software, for carrying out and implementing the inventive method. The hardware includes data interfaces for exchanging data with the subassemblies involved in implementation of the inventive method, and storage for data storage and a processor for data processing. The software is program modules for implementing the inventive method in conjunction with the hardware of the controller and the engine components.

While there have been shown and described and pointed out fundamental novel features of the invention as applied to preferred embodiments thereof, it will be understood that various omissions and substitutions and changes in the form and details of the devices illustrated and in their operation, and in the methods of the invention, may be made by those skilled in the art without departing from the spirit of the invention. It is the intention, therefore, to be limited only as indicated by the scope of the claims appended hereto.

What is claimed is:

1. A method for operation of an engine in a gaseous fuel operating mode that includes a plurality of cylinders in which a burnable air/gas mixture of air and gaseous fuel is ignited in the cylinders using a separate ignition fluid that is injected into each cylinder during a stroke of the each cylinder before top dead center (BTDC), the method comprising:

determining an air/gas mixture for injection into each of the plurality of cylinders;

injecting the air/gas mixture into each cylinder in the gaseous fuel operating mode; and injecting all of the ignition fluid that is to be injected during the stroke of each cylinder in at least two separate injections into each cylinder, which the air/gas mixture has been injected by a crank angle of 20° BTDC, wherein the ignition fluid is used to ignite the air/gas mixture in the gaseous fuel operating mode;

wherein said injecting of the ignition fluid comprises injecting the ignition fluid into the each cylinder in the at least two consecutive injections during the stroke of the each cylinder.

2. A method in accordance with claim 1, wherein during the stroke of the each cylinder the ignition fluid is injected into the each cylinder in a first injection with a first start of injection in a crank angle range between about 90° BTDC and 30° BTDC.

3. A method in accordance with claim 2, wherein the first start of injection is in the crank angle range between about 85° BTDC and 35° BTDC.

4. A method in accordance with claim 3, characterized in that the first start of injection is in the crank angle range between about 80° BTDC and 40° BTDC.

5. A method in accordance with claim 2, wherein during the stroke of the each cylinder the ignition fluid is injected into the each cylinder in a second injection with a second start of injection in a crank angle range between about 40° BTDC and 20° BTDC, and wherein the second start of injection occurs after a first end of injection of the first injection.

6. A method in accordance with claim 5, wherein said injecting of the ignition fluid further comprises injecting a further injection of injection fluid one of (i) between the first and second injections of ignition fluid after the first injection has completed, and (ii) after the second injection of ignition fluid after the second injection has completed.

7. A method in accordance with claim 1, wherein during the stroke of the each cylinder the ignition fluid is injected into the each cylinder in a second injection with a second start of injection in a crank angle range between about 40° BTDC and 20° BTDC.

8. A method in accordance with claim 1, wherein said injecting of the ignition fluid during the stroke of the each cylinder comprises a first injection of ignition fluid, a second injection of ignition fluid after the first injection, and a further injection of injection fluid one of (i) between the first and second injections of ignition fluid after the first injection has completed, and (ii) after the second injection of ignition fluid after the second injection has completed.

9. A method in accordance with claim 1, wherein said injecting of the ignition fluid during the stroke of the each cylinder comprises a first injection of ignition fluid and a second injection of ignition fluid after the first injection has completed, and wherein the ignition fluid is injected during the stroke in an injection amount of ignition fluid that is distributed between the first and second injections such that between about 60% and 80% of the injection amount is injected into the each cylinder in the first injection and between about 20% and 40% of the injection amount is injected into the each cylinder in the second injection.

10. A method in accordance with claim 1, wherein the engine is a dual-fuel engine.

11. A control device in an engine, said control device being configured to implement and carry out the method of claim 1.

12. A method in accordance with claim 1, wherein the determining an air/gas mixture for injection into each of the plurality of cylinders is performed individually for each cylinder.

13. A method in accordance with claim 12, wherein a different air/gas mixture is determined for injection into each of the plurality of cylinders.

* * * * *